(12) United States Patent
Labelle

(10) Patent No.: US 7,366,355 B2
(45) Date of Patent: Apr. 29, 2008

(54) DECODING A SEQUENCE OF DIGITAL IMAGES

(75) Inventor: Lilian Labelle, St Pierre de Plesguen (FR)

(73) Assignee: Canon Kabushiki Kaisha, Tokyo (JP)

( * ) Notice: Subject to any disclaimer, the term of this patent is extended or adjusted under 35 U.S.C. 154(b) by 659 days.

(21) Appl. No.: 10/956,020

(22) Filed: Oct. 4, 2004

(65) Prior Publication Data

US 2005/0105808 A1 May 19, 2005

(30) Foreign Application Priority Data

Oct. 7, 2003 (FR) .................................. 03 11716

(51) Int. Cl.
*G06K 9/36* (2006.01)
(52) U.S. Cl. .................................................... 382/232
(58) Field of Classification Search ................ 382/232, 382/233, 236, 240; 348/239, 578; 375/240.01, 375/E7.04
See application file for complete search history.

(56) References Cited

U.S. PATENT DOCUMENTS 6,362,850 B1 * 3/2002 Alsing et al. ............... 348/239
6,907,073 B2 * 6/2005 Sawhney et al. ....... 375/240.14
2001/0031003 A1 10/2001 Sawhney et al. ....... 375/240.14
2002/0176629 A1 11/2002 Labelle ....................... 382/232
2004/0006644 A1 1/2004 Henocq et al. ............. 709/246
2005/0105808 A1 5/2005 Labelle ....................... 382/233

FOREIGN PATENT DOCUMENTS

EP 0 895 420 A2 2/1999

* cited by examiner

*Primary Examiner*—Jose L Couso
(74) *Attorney, Agent, or Firm*—Fitzpatrick, Cella, Harper & Scinto

(57) ABSTRACT

A method of decoding a sequence of coded digital images comprising a set of key images for reconstructing the sequence by interpolation, includes the steps of:
  associating an obtainment time limit with each key image according to a predetermined criterion,
  sending a request to a distant terminal in order to receive a key image, according to the time limit associated with the key image in question,
  receiving the key images in response to the requests sent to the distant terminal,
  determining an interpolation mode for each image in the sequence according to the key images obtained.

14 Claims, 6 Drawing Sheets

DECODING A SEQUENCE OF DIGITAL IMAGES

This application claims priority from French patent application No. 0311716 filed on Oct. 7, 2003, which is incorporated herein by reference.

FIELD OF THE INVENTION

The present invention concerns in general terms the decoding of a sequence of digital images.

The case is considered more particularly where a sequence of digital images is downloaded from a server terminal to a client terminal. The transmitted data are in a hierarchy, which makes it possible to play the sequence at the client terminal without waiting for the entire file to be downloaded.

BACKGROUND OF THE INVENTION

In this context, the company Macromedia has defined a file format known as SWF which describes time animations of multimedia data from vectorial data. An animation contained in an SWF file is generally referred to as "Flash" data.

When a client terminal receives an animation contained in an SWF file, it in fact receives minimal data which makes it possible to reconstruct only part of the images, referred to as key images. The key images are typically the initial image, the final image and intermediate images distributed in the animation.

The client terminal decodes these data and calculates the other images of the animation by interpolation, so as to be able to play the animation at a predefined rate.

However, in order to minimize the size of the SWF file, the latter does not strictly speaking contain the coding data of the key images but only the requests to be sent for downloading the corresponding data.

Under these circumstances, it may happen that the client terminal does not actually receive at an appropriate time all the key images which it needs to reconstruct the animation. The interpolation is then interrupted and the display of the animation freezes.

Furthermore, well-known interpolation techniques would send all requests, thereby wasting some network bandwidth if some key images were received too late to be used for interpolation.

SUMMARY OF THE INVENTION

The present invention aims to remedy the drawbacks of the prior art by providing a method and device for decoding a sequence of digital images comprising a set of key images for reconstructing the sequence by interpolation, this method and device making it possible in some embodiments to decode and play the sequence even if all the key images are not received at an appropriate time for correct interpolation, and to avoid requesting key images if determined that these key images will not be available early enough for interpolation.

To this end, the invention proposes a method of decoding a sequence of coded digital images comprising a set of key images for reconstructing the sequence by interpolation, characterized by the steps of:

associating an obtainment time limit with each key image according to a predetermined criterion, sending a request to a distant terminal in order to receive a key image, according to the time limit associated with the key image in question, receiving the key images in response to the requests sent to the distant terminal, determining an interpolation mode for each image in the sequence according to the key images obtained.

The invention makes it possible to select the interpolation mode best adapted to the key images received. Each image to be interpolated is processed according to the key images actually received. Thus the quality of the interpolated images is adapted to the transmission conditions.

The present invention also ensures that all received key frames are used to interpolate images on time. In order to obtain the best quality interpolated images, it is essential to interpolate intermediate images from closest key images.

The time limit makes it possible to avoid getting stuck on the reception of a key image.

According to a preferred characteristic, the time limit TT is obtained according to the formula: $TT=t+1/FR$, in which t is the time elapsed since the start of the animation and FR is the animation rate. This time limit gives satisfactory experimental results.

According to a preferred characteristic, the interpolation is carried out in a loop. Thus, at each new loop, the key images which have just been received are taken into account for the interpolation. The interpolation is therefore finer and finer as the loops continue.

According to a preferred characteristic, the sequence to be decoded is in a file to the SWF format. This format is commonly used.

According to a preferred characteristic, the interpolation mode for each image in the sequence is selected from amongst:

an interpolation made from a key image and the resolution of the image to be calculated, an interpolation made from two key images framing the image to be calculated.

These interpolation modes are relatively simple to implement.

Correspondingly, the invention concerns a device for decoding a sequence of coded digital images comprising a set of key images for reconstructing the sequence by interpolation, characterized by:

means of associating an obtainment time limit with each key image according to a predetermined criterion, means of sending a request to a distant terminal in order to receive a key image, according to the time limit associated with the key image in question, means of receiving the key images in response to the requests sent to the distant terminal, means of determining an interpolation mode for each image in the sequence according to the key images obtained.

The device according to the invention comprises means of using the previously disclosed characteristics and has advantages similar to those previously presented.

The invention also concerns a digital apparatus including the device according to the invention or means of implementing the method according to the invention. The advantages of the device and of the digital apparatus are identical to those disclosed previously.

An information storage means which can be read by a computer or by a microprocessor, optionally integrated into the device, and optionally removable, stores a program implementing the method according to the invention.

A computer program which can be read by a microprocessor and comprising one or more sequences of instructions is adapted to implement the methods according to the invention.

BRIEF DESCRIPTION OF THE DRAWINGS

The characteristics and advantages of the present invention will emerge more clearly from a reading of a preferred embodiment illustrated by the accompanying drawings, in which.

DETAILED DESCRIPTION OF A PREFERRED EMBODIMENT

Figure 1:
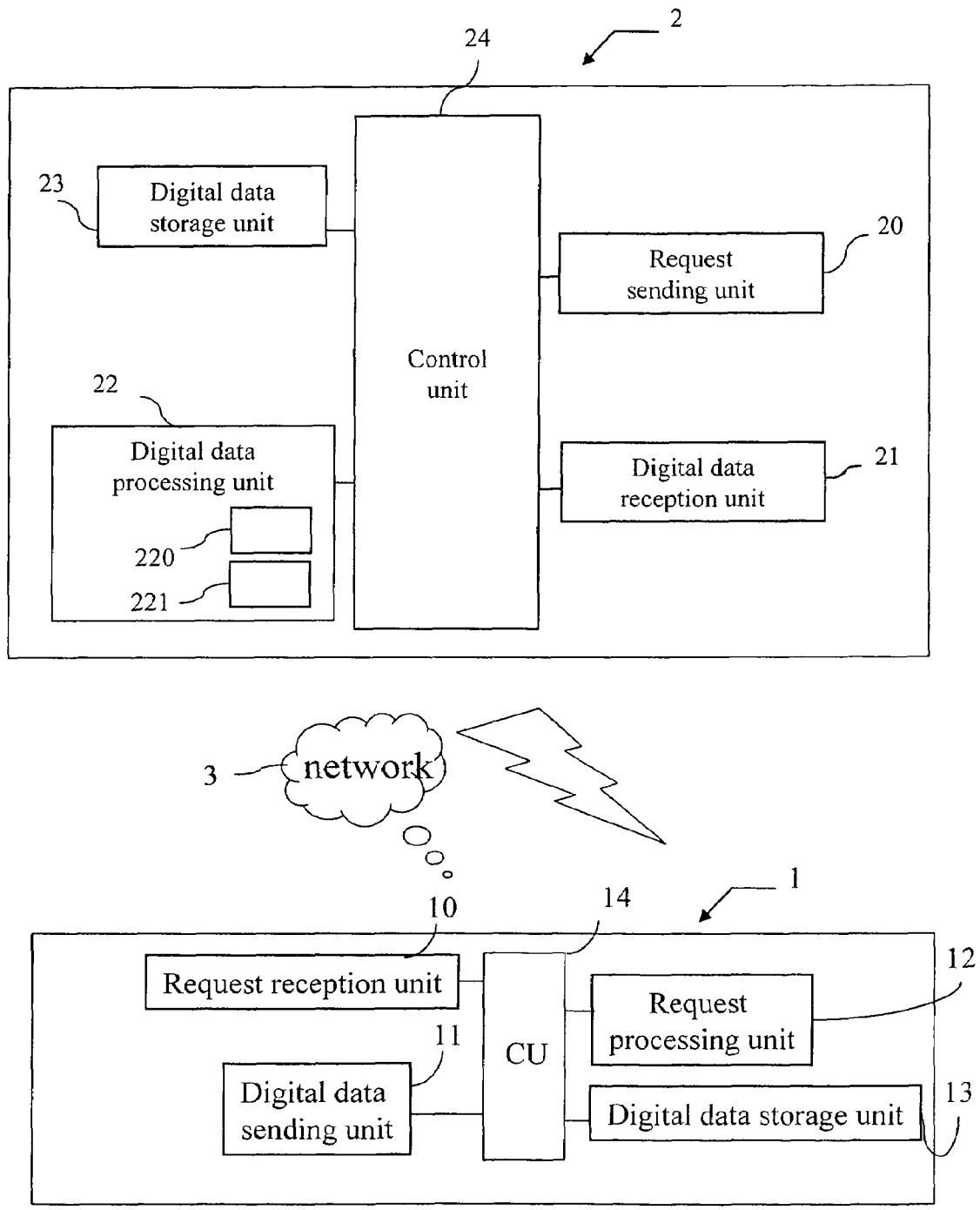
FIG. 1 is an embodiment of a device implementing the invention.

According to the chosen embodiment depicted in FIG. 1, a server 1 is connected to client terminals 2, only one of which is shown, by means of a communication network 3.

The server 1 and client terminal 2 are computers, an exemplary architecture of which is described below.

The connection between the two devices is conventional and will not be described here. It is for example of the http type. It is assumed that the data transmission is effected without loss.

The server 1 comprises a unit 10 for receiving requests coming from the client terminal 2. It also comprises a unit 11 for sending digital data to the client terminal 2.

The request reception unit 10 transmits the received requests to the processing unit 12. The processing comprises the identification of the data requested, the formatting thereof and the transmission thereof by means of the unit 11.

The server 1 also comprises a memory 13 in which data are stored. A control unit 14 controls the functioning of the units of the server 1.

The client terminal 2 comprises a unit 20 for sending requests to the server 1. It also comprises a unit 21 for receiving digital data coming from the server 1.

The unit 21 transmits the received data to the processing unit 22. The processing which is the object of the present invention is detailed below by means of algorithms.

The processing unit 22 comprises:
means 220 of associating an obtainment time limit for each key image according to a predetermined criterion,
means 221 of determining the interpolation mode for each image in the sequence according to the key images obtained.

The sending of a request to a distant terminal to receive a key image is carried out according to the time limit associated with the key image in question.

The client terminal 2 also comprises a memory 23 in which data is stored. A control unit 24 controls the functioning of the client terminal units 2.

Figure 2:
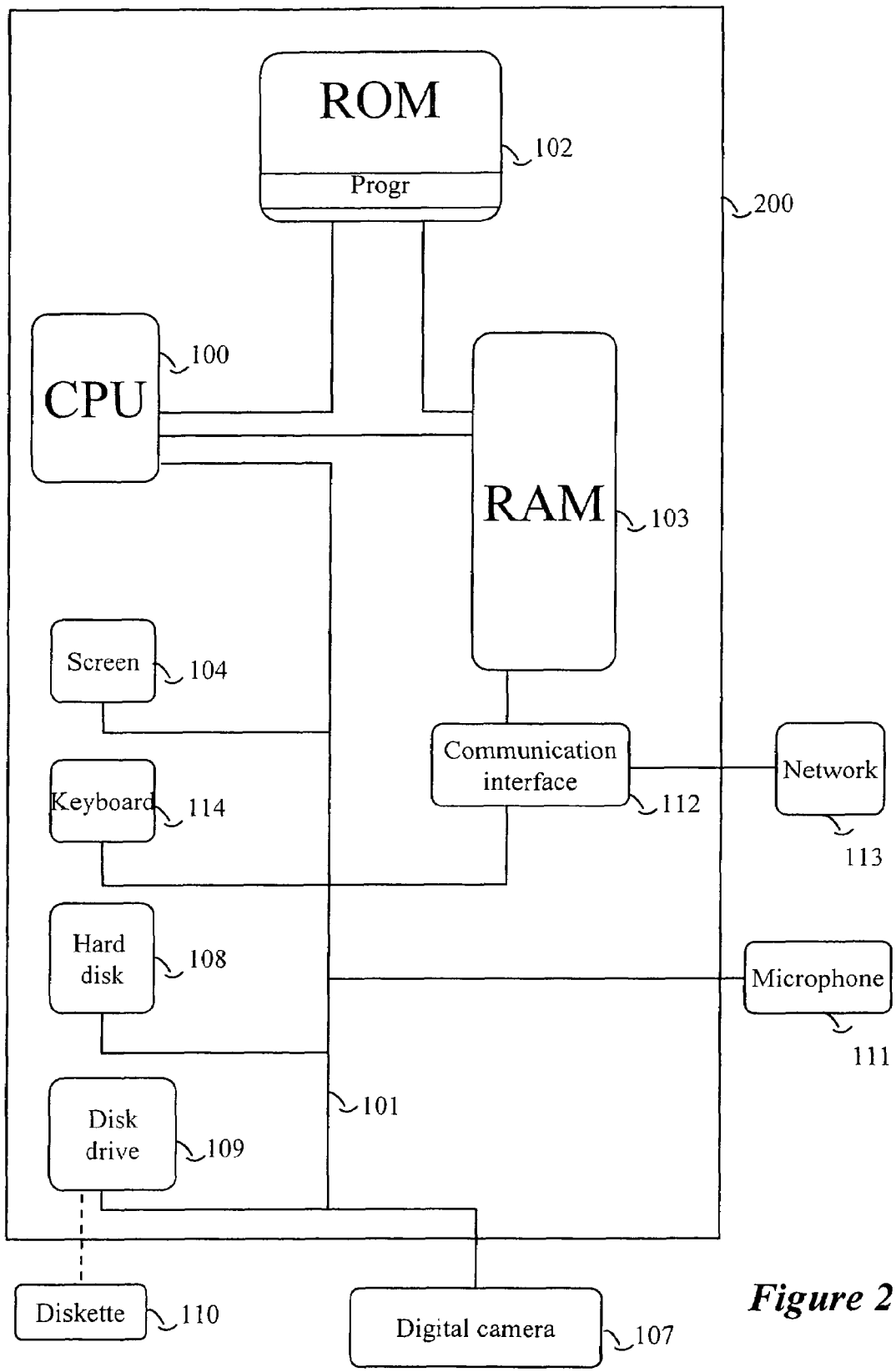
FIG. 2 depicts a decoding device according to the invention.

According to the chosen embodiment depicted in FIG. 2, a device implementing the invention is for example a microcomputer 200 connected to various peripherals, for example a digital camera 107 (or a scanner, or any image acquisition or storage means) connected to a graphics card and supplying information to be processed according to the invention.

The device 200 comprises a communication interface 112 connected to a network 113 able to transmit digital data to be processed or conversely to transmit data processed by the device. The device 100 also comprises a storage means 108 such as for example a hard disk. It also comprises a drive 109 for a disk 110. This disk 110 may be a diskette, a CD-ROM or a DVD-ROM for example. The disk 110, like the disk 108, can contain data processed according to the invention as well as the program or programs implementing the invention which, once read by the device 10, will be stored on the hard disk 108. According to a variant, the program enabling the device to implement the invention can be stored in read only memory 102 (referred to as ROM in the drawing). In a second variant, the program can be received in order to be stored in an identical fashion to that described previously by means of the communication network 113.

This same device has a screen 104 for displaying the data to be processed or serving as an interface with the user, who can thus parameterize certain processing modes, by means of the keyboard 114 or any other means (a mouse for example).

The central unit 100 (referred to as CPU in the drawing) executes the instructions relating to the implementation of the invention, instructions stored in the read only memory 102 or in the other storage elements. On powering up, the processing programs stored in a non-volatile memory, for example the ROM 102, are transferred into the random access memory RAM 103, which will then contain the executable code of the invention as well as registers for storing the variables necessary to the implementation of the invention.

In more general terms, an information storage means, which can be read by a computer or by a microprocessor, optionally integrated into the device, and optionally removable, stores a program implementing the method according to the invention.

The communication bus 101 affords communication between the various elements included in the microcomputer 200 or connected to it. The representation of the bus 101 is not limiting and in particular the central unit 100 is able to communicate instructions to any element of the microcomputer 200 directly or by means of another element of the microcomputer 200.

Figure 3:
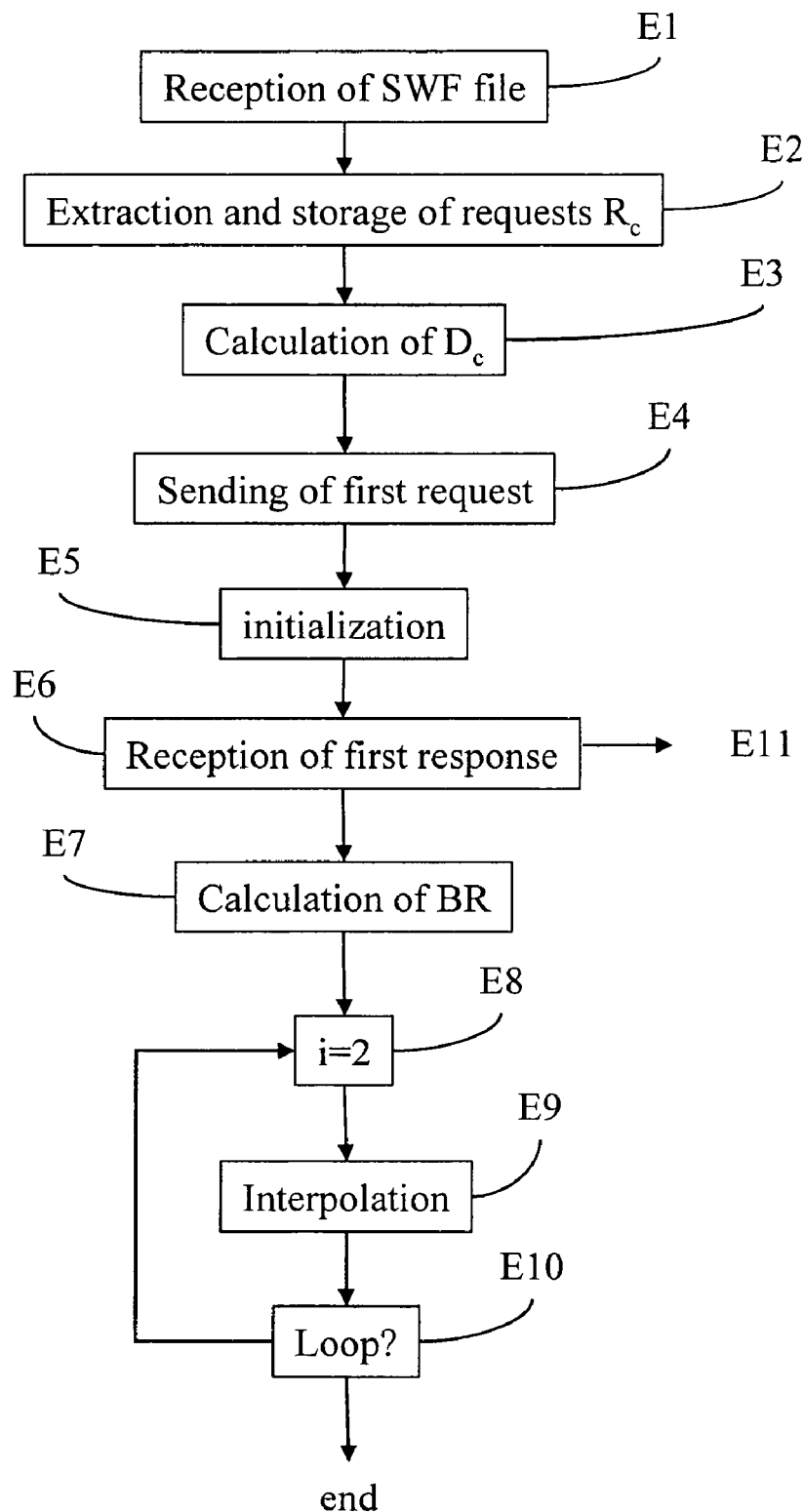
FIG. 3 is an embodiment of a decoding method according to the invention.

FIG. 3 depicts an embodiment of the method according to the invention. This method is implemented in the client terminal 2 and comprises steps E1 to E10.

The method is implemented in the form of an algorithm which can be stored in whole or in part in any information storage means capable of cooperating with the microprocessor. This storage means can be read by a computer or by a microprocessor. This storage means is optionally integrated into the device, and may be removable. For example, it may comprise a magnetic tape, a diskette or a CD-ROM (fixed-memory compact disk).

The case is considered where the data requested by the client terminal 2 represent animations, for example constructed according to the so-called "Flash" technique developed by the company Macromedia.

Thus an SWF file comprises a description of the animation to the ActionScript format. The SWF format is the so-called "Flash" format defined by the company Macromedia. The Flash MX software for creating content in the flash format of this company is available via the Internet at the address: http://www.macromedia.com/software/flash/.

The book entitled "Flash MX" by Guylaine Monnier, published by Dunod, Paris, 2002, describes this software.

Figure 4:
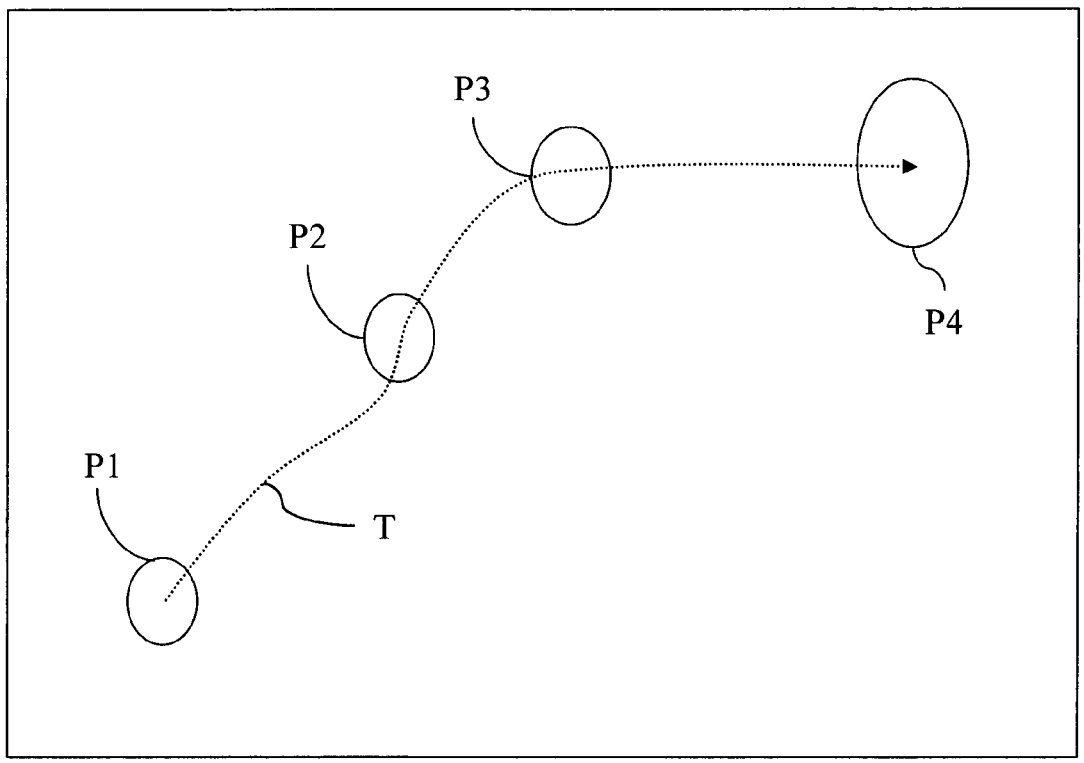
FIG. 4 depicts schematically the animation of an object.
Figure 5:
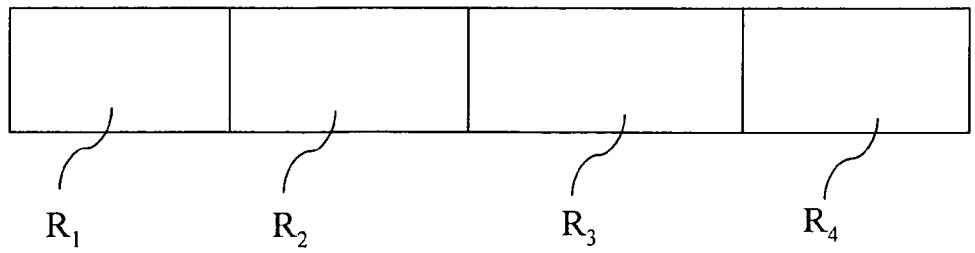
FIG. 5 depicts a file containing the animation of an object.

The case is more particularly considered where the SWF file contains a time animation of an object as depicted in FIGS. 4 and 5. FIG. 4 shows schematically the animation of the object. Four positions of the object $P_1$ to $P_4$ are depicted, as well as the path T joining these positions.

The position $P_1$, is the initial position of the object. The positions $P_2$ and $P_3$ are intermediate positions and the position $P_4$ is the final position of the object.

Each position corresponds to an image, that is to say, in the case shown, an initial image, two intermediate images and a final image. These images are referred to as key images hereinafter.

The key images are obtained by requests R1 to R4 which are contained in the SWF file of the animation, depicted in FIG. 5.

The key images are next used for calculating intermediate images by interpolation.

It is assumed that the client terminal 2 has established a connection with the server 1. The client terminal 2 has requested the animation from the server 1 by sending a request to it. The server 1 has received and processed this request and sent in response the corresponding SWF file, depicted in FIG. 5.

The above operations are conventional and are not detailed here.

Step E1 is the reception of the SWF file by the client terminal 2. The SWF file is received by the reception unit 20 and stored in the memory 23.

The following step E2 is the extraction and storage of the requests $R_c$ contained in the SWF file. In the example shown, the requests $R_1$ to $R_4$ are extracted and stored.

The following step E3 is the calculation for each request $R_c$ of a quantity of data $D_c$. This quantity is expressed in bytes and corresponds to the quantity of data transmitted for sending the request and the quantity of image data received in response. The quantities $D_1$ to $D_4$ are stored in memory 23.

The following step E4 is the sending of the first request $R_1$ to the server 1. The purpose of this request is to obtain the initial key image of the animation. In a variant, the first request makes it possible to obtain the initial and final key images of the animation.

The following step E5 is an initialization at which there is calculated the memory location necessary for storing all the images of the animation, namely the key images and the images interpolated from the key images. For this purpose, the duration of the animation and the rate FR at which it must be played are extracted from the SWF file. The rate FR is expressed in number of images per second. The total number N of images of the animation is calculated according to the duration and rate of the animation and the necessary memory space is reserved.

An indicator $Q_i$ is associated with each image $B_i$ of the animation, where i is an integer between 1 and N. The indicator $Q_i$ is initially set to the value 0 in order to indicate that the image $B_i$ must be determined. It is set to the value 1 when the image $B_i$ is decoded but does not correspond to the original image at maximum quality. The indicator $Q_i$ is set to the value 2 when the image $B_i$ is decoded and to the maximum quality. Finally, the indicator $Q_i$ is set to the value 3 when the image $B_i$ is a key image.

The following step E6 is the reception of the first key image, its decoding and its storage in memory.

Step E6 is followed by two processes which are executed in parallel. It involves firstly sending the following requests and secondly calculating images by interpolation according to the key images already received.

Figure 6:
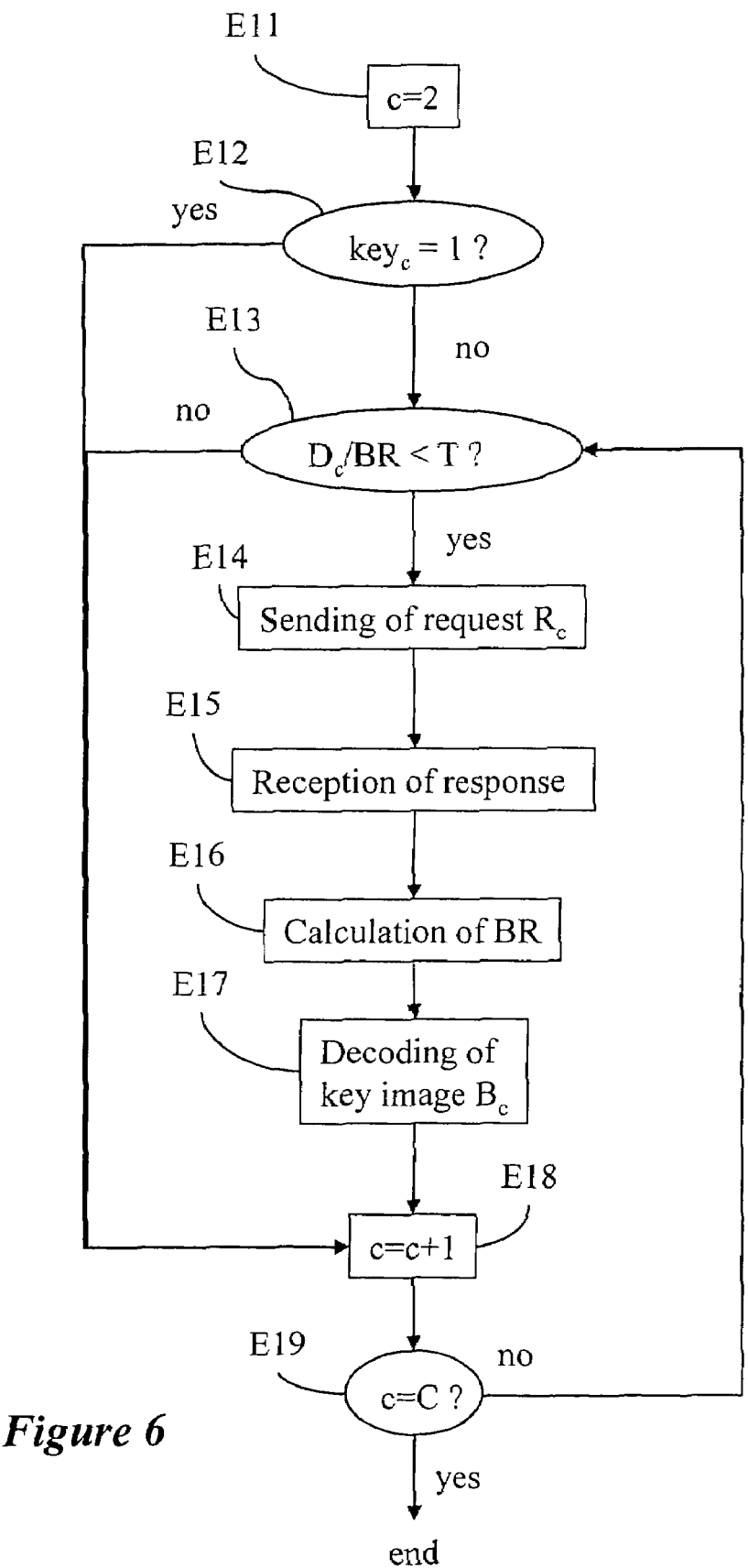
FIG. 6 depicts an embodiment of the sending of a request used in the present invention.

The sending of the following requests is detailed below with reference to FIG. 6.

The calculation of the images by interpolation according to the key images already received is now detailed.

Step E7 is the calculation of the average rate BR according to the following formula:

$$BR=1/P.(\Sigma_p D_p/T_p)$$

where P is the number of responses received following the sending of the request, the variable p varying between 1 and P, and $T_p$ is the time between the time of sending the request $R_p$ and the time of receiving the response containing the image data.

The following step E8 is an initialization at which an index i is initialized to the value 2. The index i is an integer which represents the index of the current image $B_i$ at the time of interpolation which will be described below.

The following step E9 is an image interpolation from the key images received. This step is detailed below with reference to FIG. 7.

The following step E10 is a test for determining whether the animation must be played in a loop. If the response is positive, then this step is followed by the previously described step E8.

If the response is negative at step E10 or when an instruction to stop the animation is received, the processing is terminated.

The sending of the following request is now detailed with reference to FIG. 6.

It will be recalled that the first request has already been sent (step E4) and that it is a case here of sending requests, the purpose of each of which is to receive a key image in response.

Step E11 is an initialization at which a counter c is initialized to the value 2. The value of the counter c indicates the rank of the current request.

In addition, a $key_c$ indicator is associated with each request of the SWF file received. The $key_c$ indicator is equal to 1 if the corresponding key image $B_c$ has been received and is equal to 0 otherwise.

The following step E12 is a test for determining whether the current key image $B_c$ has been received.

When the response is negative, then step E12 is followed by step E13. Step E13 is a test for determining whether an estimated time $D_c/BR$ for receiving the current key image $B_c$ is less than a predetermined threshold TT.

The predetermined threshold TT is given by the formula:

$$TT=t+1/FR$$

where t is the time elapsed since the start of the animation.

If the response is positive at step E13, then this step is followed by step E14, which is the sending of the request $R_c$.

The following step E15 is the reception of the response to the request $R_c$.

The following step E16 is the updating of the average rate BR.

The following step E17 is the decoding of the key image received $B_c$. If the data transmitted are not compressed, decoding is not necessary.

The following step E18 is the incrementation of the counter c by one unit.

When the response is positive at step E12 or negative at step E13, this step is followed by step E18.

Step E18 is followed by step E19, which is a test for determining whether the counter c is at the value C, that is to say whether all the key images have been considered.

When the response is negative, then this step is followed by the previously described step E13.

When the response is positive, then all the key images have been received and this processing is terminated.

Figure 7:
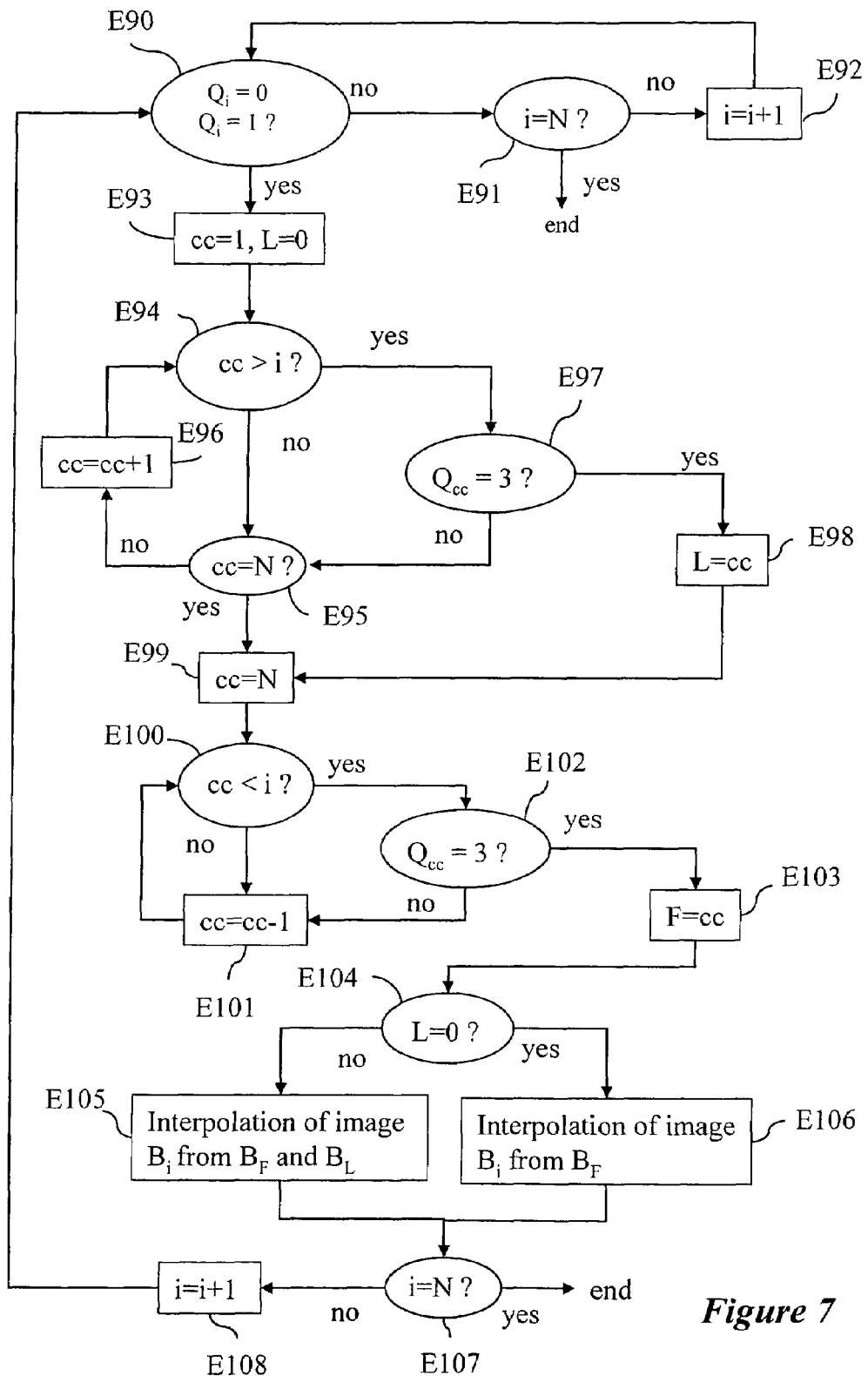
FIG. 7 depicts an embodiment of an interpolation used in the present invention.

The interpolation step E9 is now detailed in FIG. 7 in the form of an algorithm comprising steps E90 to E108.

Two types of interpolation are envisaged. The interpolation can be carried out from a key image and the resolution expressed in terms of number of lines and columns of the image to be calculated. This type of interpolation is in particular used for effecting a zoom in an image.

The interpolation can also be performed from two key images framing the image to be calculated.

A current image $B_i$ is considered.

Step E90 is a test for determining whether the indicator $Q_i$ of the current image $B_i$ is at the value 0 or at the value 1, that is to say whether the current image is to be decoded or whether it has been decoded but its quality is not maximal.

When the response is negative, then this step is followed by step E91, which is a test for determining whether the current image is the last image to be processed.

When the response is negative at step E91, this step is followed by step E92 at which the index i is incremented by one unit in order to consider the following image. Step E92 is followed by the previously described step E90.

When the response is positive at step E91, the processing is terminated.

When the response is positive at step E90, this step is followed by step E93 at which a counter cc is set to the value 1 and a parameter L to zero.

The purpose of the following steps E94 to E98 is to seek the received key image which is the closest after the current image $B_i$ in the animation.

Thus step E93 is followed by step E94, which is a test for determining whether the value of the counter cc is greater than that of the index i. If the response is negative, then this step is followed by step E95, which is a test for determining whether the value of the counter cc is equal to the value N.

When the response is negative at step E95, this step is followed by step E96, at which the value of the counter cc is incremented by one unit in order to consider the following image. Step E96 is followed by the previously described step E94.

When the response is positive at step E94, this step is followed by step E97, which is a test for determining whether the image $B_{cc}$ is a received key image, that is to say whether $Q_{cc}$ is equal to 3.

When the response is negative at step E97, this step is followed by the previously described step E95.

When the response is positive at step E97, this step is followed by step E98, at which the parameter L is set to the value cc, which is the index of the closest key image after the current image $B_i$ in the animation.

Step E98 is followed by step E99, at which the counter cc is set to the value N.

The purpose of steps E99 to E103 is to seek the received key image which is the closest before the current image $B_i$ in the animation.

Thus step E99 is followed by step E100, which is a test for determining whether the value of the counter cc is less than that of the index i.

If the response is negative at step E100, then this step is followed by step E101 at which the value of the counter cc is decremented by one unit in order to consider the previous image in the animation. Step E101 is followed by the previously described step E100.

When the response is positive at step E100, this step is followed by step E102, which is a test for determining whether the image $B_{cc}$ is a key image received, that is to say whether $Q_{cc}$ is equal to 3.

When the response is negative at step E102, this step is followed by the previously described step E101.

When the response is positive at step E102, this step is followed by step E103, at which the parameter F is set to the value cc, which is the index of the key image closest before the current image $B_i$.

Step E103 is followed by steps E104 to E106, which are the appropriate interpolation of the current image $B_i$, from the key images $B_F$ and $B_L$ or from the key image $B_F$ and the resolution of the image to be calculated.

Step E104 is a test for determining whether the value of the parameter L is zero.

If the response is negative at step E104, then this step is followed by step E105, at which the interpolation of the image $B_i$ is made from the key images $B_F$ and $B_L$ framing it.

When the response is positive at step E104, this step is followed by step E106, at which the interpolation of the image $B_i$ is made from the key image $B_F$ which precedes it in the image sequence and the resolution of the image to be calculated.

In both cases, the appropriate interpolation of the current image $B_i$ is a conventional interpolation and is not described here.

Steps E105 and E106 are followed by step E107, which is a test for determining whether the current image $B_i$ is the last image to be processed.

When the response is negative at step E107, this step is followed by step E108 at which the index i is incremented by one unit in order to consider the following image. Step E108 is followed by the previously described step E90.

When the response is positive at step E107, the processing is terminated.

It will be understood that the present invention is in no way limited to the embodiments described and depicted but quite the contrary encompasses any variant within the capability of a person skilled in the art.

The invention claimed is:

1. A method of decoding a sequence of coded digital images comprising a set of key images for reconstructing the sequence by interpolation, comprising the steps of:
    associating an obtainment time limit with each key image according to a predetermined criterion;
    sending a request to a distant terminal in order to receive a key image, according to the time limit associated with the key image in question;
    receiving the key images in response to the requests sent to the distant terminal; and
    determining an interpolation mode for each image in the sequence according to the key images obtained.

2. A method according to claim 1, wherein the time limit TT is obtained according to the formula: TT=t+1/FR, in which t is the time elapsed since the start of the animation and FR is the animation rate.

3. A method according to claim 1 or 2, wherein the interpolation is made in a loop.

4. A method according to claim 1 or 2, wherein the sequence to be decoded is in an SWF file.

5. A method according to claim 1 or 2, wherein the interpolation mode for each image in the sequence is selected from among:

an interpolation made from a key image and the resolution of the image to be calculated; and an interpolation made from two key images framing the image to be calculated.

6. A device for decoding a sequence of coded digital images comprising a set of key images for reconstructing the sequence by interpolation, comprising:

means of associating an obtainment time limit with each key image according to a predetermined criterion;

means of sending a request to a distant terminal in order to receive a key image, according to the time limit associated with the key image in question;

means of receiving the key images in response to the requests sent to the distant terminal; and means of determining an interpolation mode for each image in the sequence according to the key images obtained.

7. A device according to claim 6, wherein the association means are adapted to consider a time limit TT which is obtained according to the formula: TT=t+1/FR, in which t is the time elapsed since the start of the animation and FR is the rate of the animation.

8. A device according to claim 6 or 7, further comprising interpolation means adapted to make the interpolation in a loop.

9. A device according to claim 6 or 7, adapted to decode a sequence which is in an SWF file.

10. A device according to claim 6 or 7, wherein said means of determining the interpolation mode are adapted to select, for each image in the sequence, an interpolation mode from among:

an interpolation made from a key image and the resolution of the image to be calculated; and an interpolation made from two key images framing the image to be calculated.

11. A determination device according to claim 6 or 7, wherein said means of associating, said means of sending, said means of receiving, and said means of determining are incorporated in:

a microprocessor, a read only memory containing a program for processing the data, and a random access memory containing registers adapted to record variables modified during the execution of said program.

12. An apparatus for processing a digital image, comprising means adapted to implement the method according to claim 1 or 2.

13. An apparatus for processing a digital image, comprising the device according to claim 6 or 7.

14. A computer program which can be loaded into a programmable apparatus, encoded with sequences of instructions or portions of software code for implementing the steps of the method according to claim 1, when the computer program is loaded into and executed by the programmable apparatus.

* * * * *

UNITED STATES PATENT AND TRADEMARK OFFICE
CERTIFICATE OF CORRECTION

| | |
|---|---|
| PATENT NO. | : 7,366,355 B2 |
| APPLICATION NO. | : 10/956020 |
| DATED | : April 29, 2008 |
| INVENTOR(S) | : Lilian Labelle |

It is certified that error appears in the above-identified patent and that said Letters Patent is hereby corrected as shown below:

COLUMN 10:

Line 5, "determination device" should read --device--.

Signed and Sealed this

Seventeenth Day of February, 2009

JOHN DOLL
*Acting Director of the United States Patent and Trademark Office*